Nov. 24, 1942.   F. E. BERTRAND   2,302,738
MACHINE FOR OPERATING UPON SOLES
Filed July 26, 1940   10 Sheets-Sheet 1

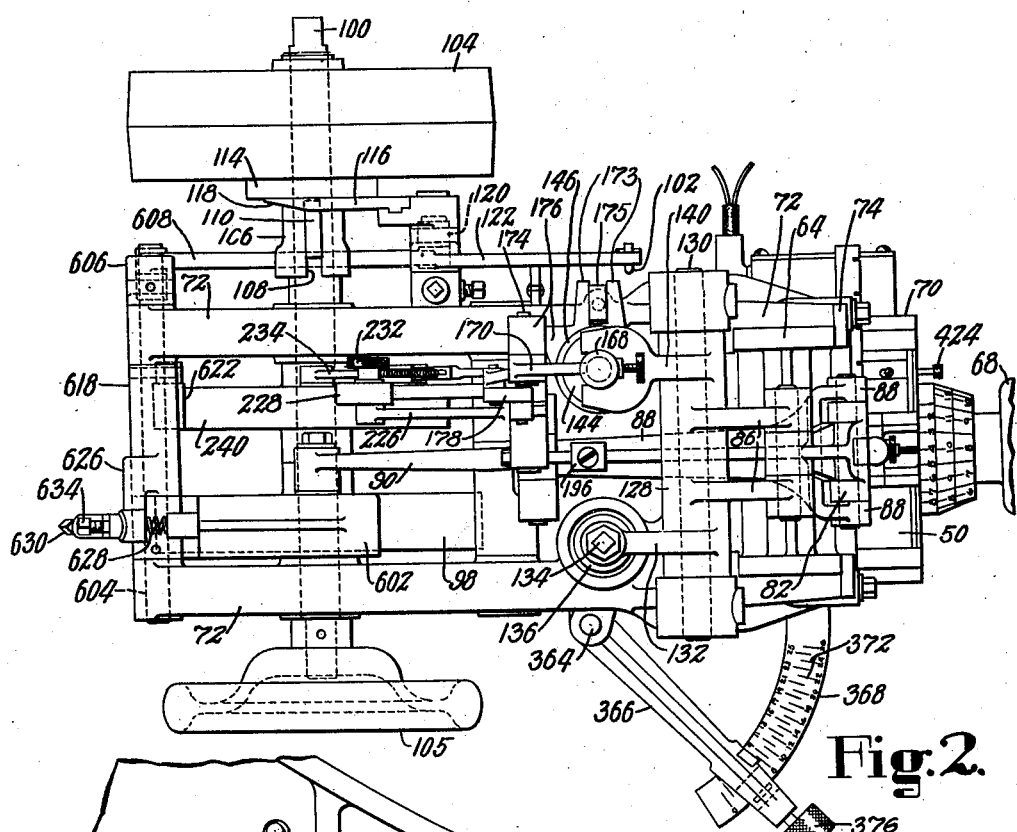

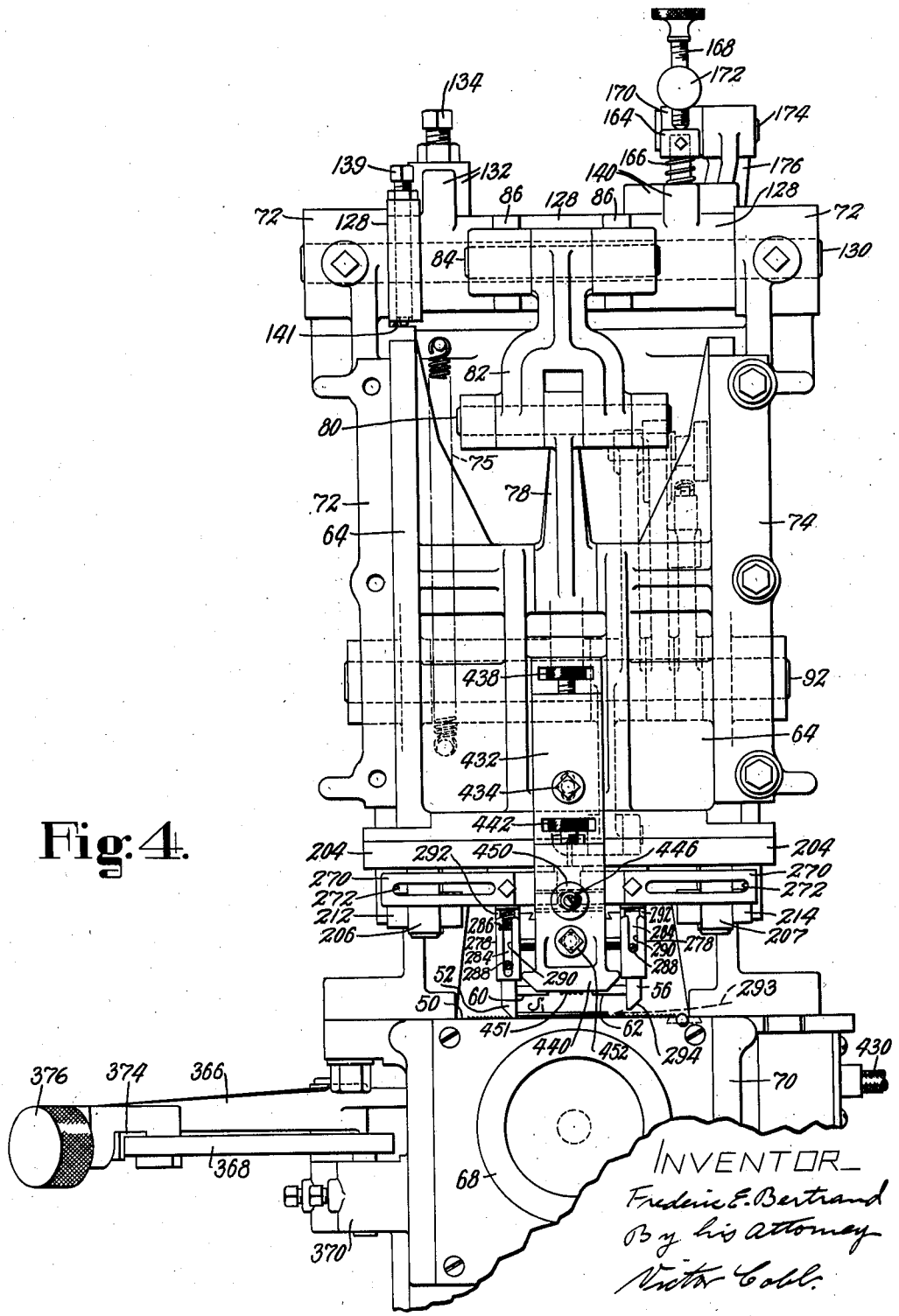

Nov. 24, 1942.   F. E. BERTRAND   2,302,738
MACHINE FOR OPERATING UPON SOLES
Filed July 26, 1940   10 Sheets-Sheet 4
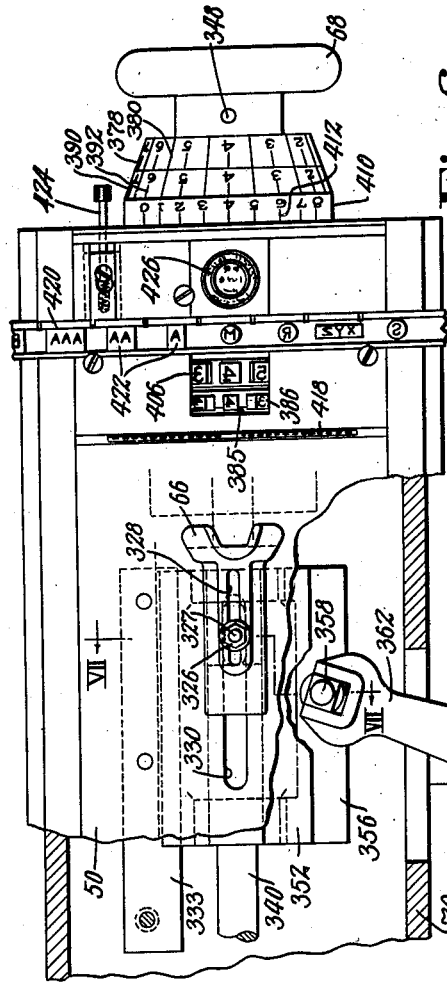
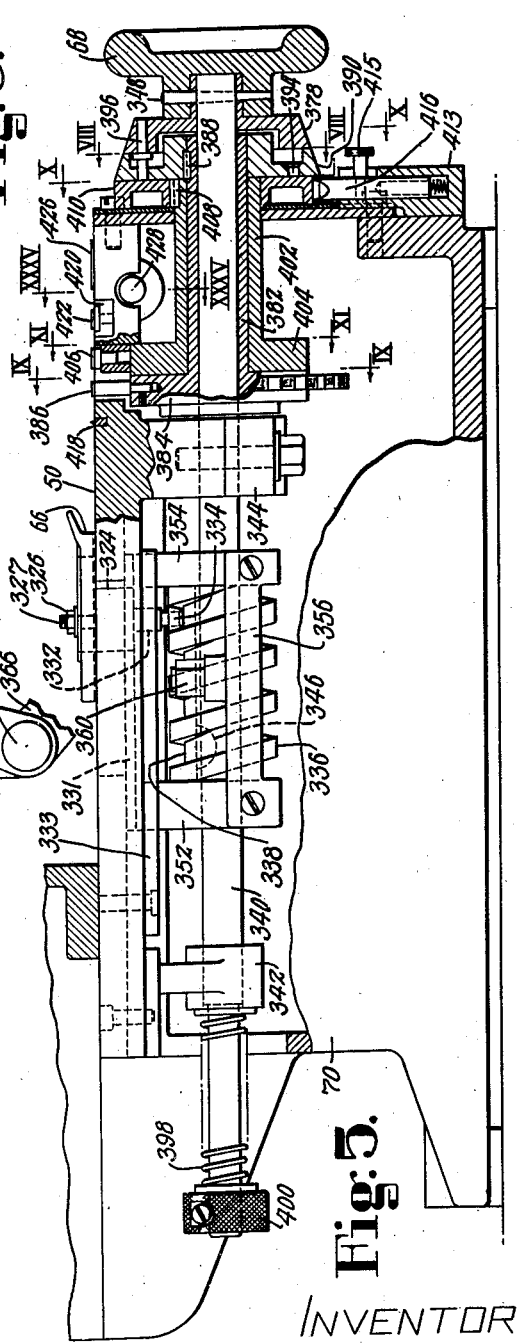
INVENTOR.
Frederic E. Bertrand
By his attorney
Victor Cobb.

Nov. 24, 1942.  F. E. BERTRAND  2,302,738
MACHINE FOR OPERATING UPON SOLES
Filed July 26, 1940  10 Sheets-Sheet 5

INVENTOR
Frederic E. Bertrand
By his attorney
Victor Cobb.

Nov. 24, 1942.  F. E. BERTRAND  2,302,738
MACHINE FOR OPERATING UPON SOLES
Filed July 26, 1940  10 Sheets-Sheet 6

INVENTOR
Frederic E. Bertrand
By his Attorney
Victor Coleb.

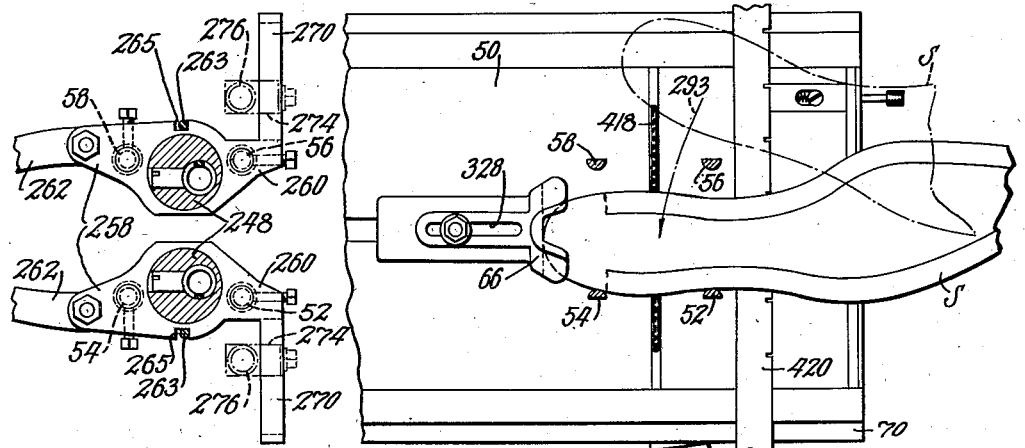
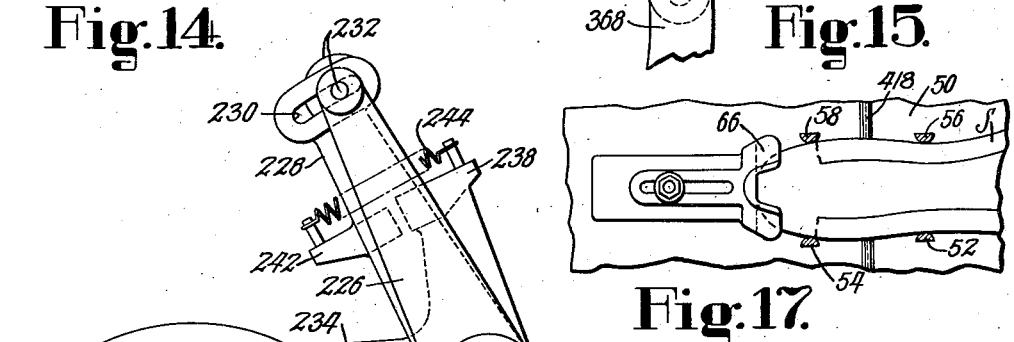
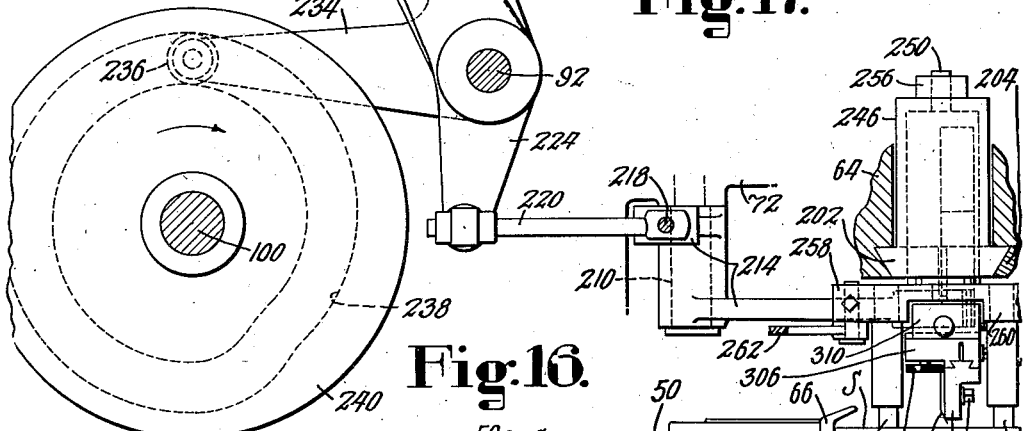
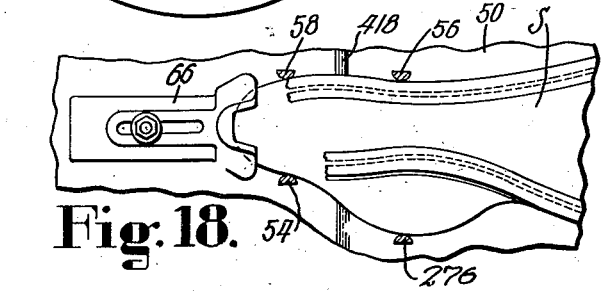

Nov. 24, 1942. F. E. BERTRAND 2,302,738
MACHINE FOR OPERATING UPON SOLES
Filed July 26, 1940 10 Sheets-Sheet 9
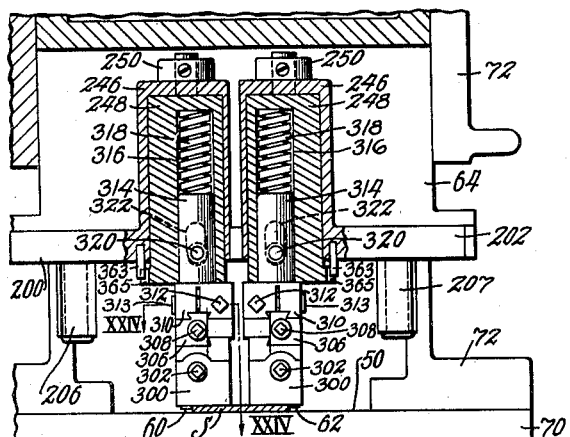
Fig. 22.
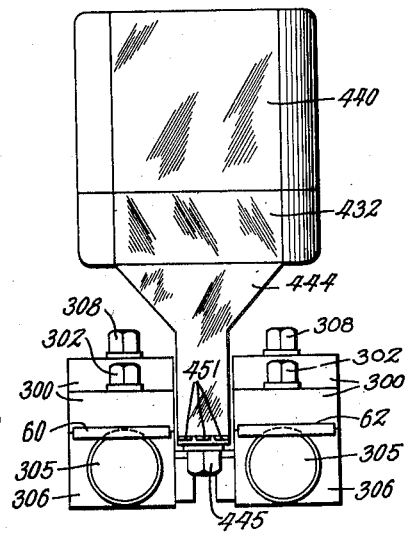
Fig. 23.
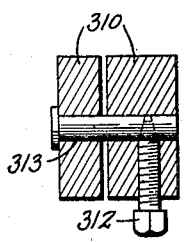
Fig. 24.
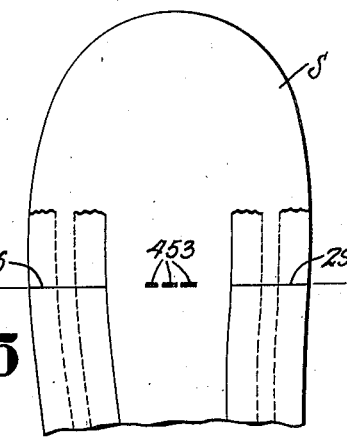
Fig. 25
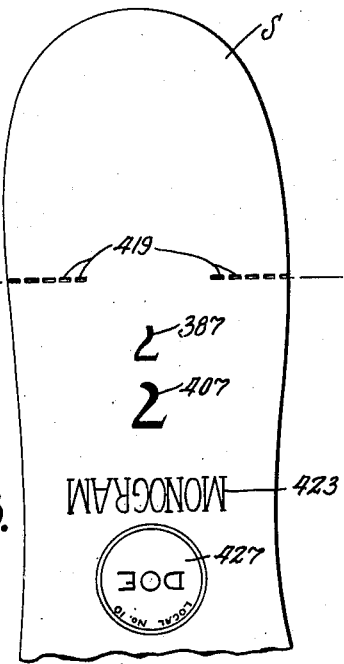
Fig. 26.
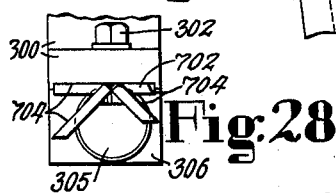
Fig. 28
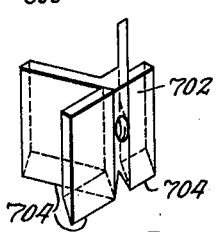
Fig. 27.
Fig. 29.
INVENTOR.
Frederic E. Bertrand
By his attorney
Victor Cobb.

Nov. 24, 1942.  F. E. BERTRAND  2,302,738
MACHINE FOR OPERATING UPON SOLES
Filed July 26, 1940  10 Sheets-Sheet 10
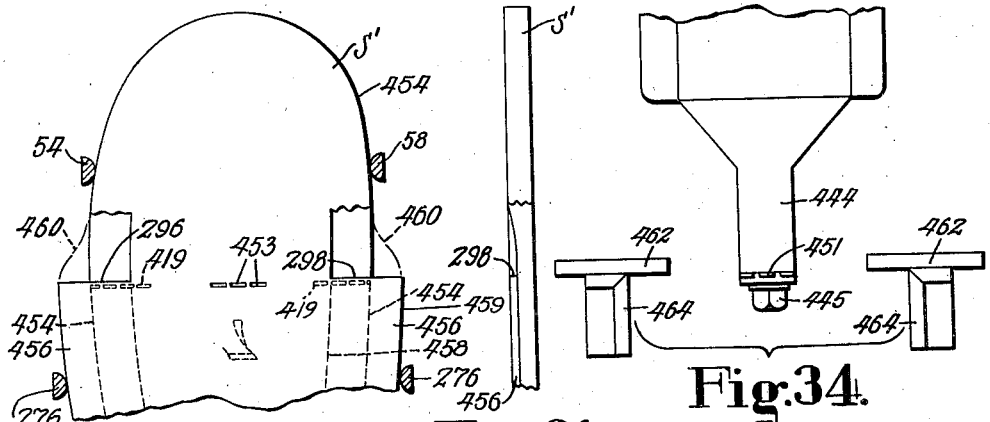
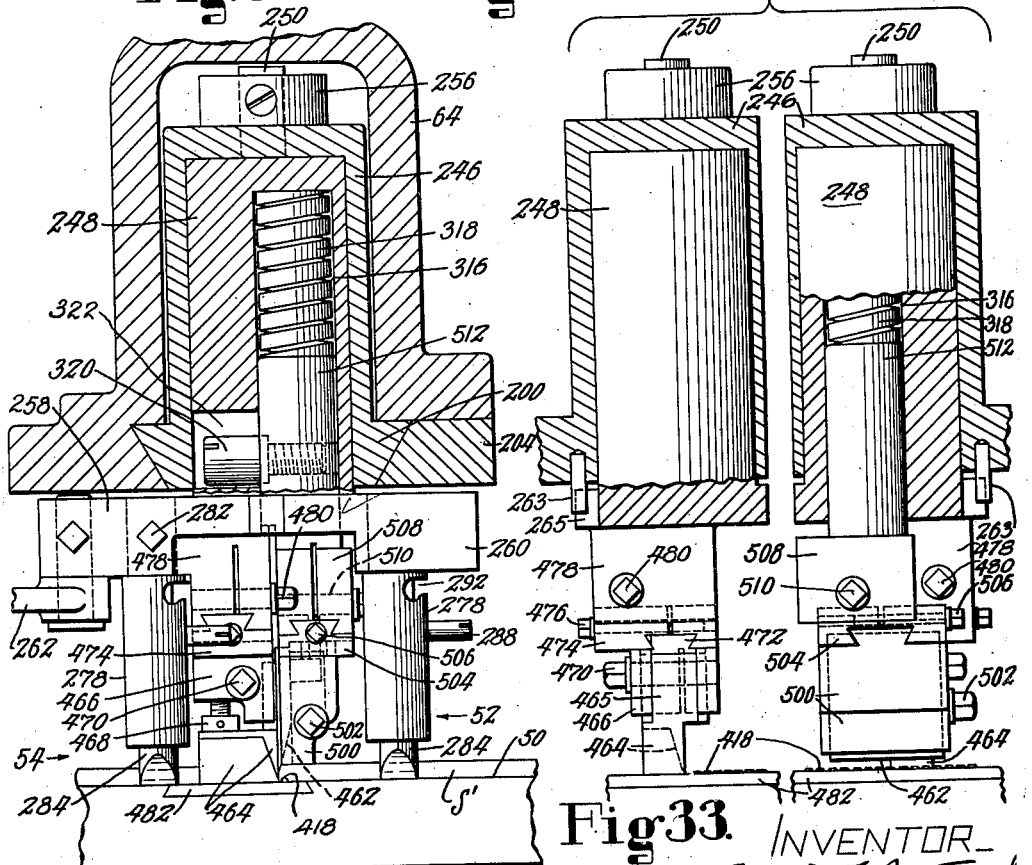

Patented Nov. 24, 1942

2,302,738

UNITED STATES PATENT OFFICE 2,302,738

MACHINE FOR OPERATING UPON SOLES

Frederic E. Bertrand, Lynn, Mass., assignor to United Shoe Machinery Corporation, Flemington, N. J., a corporation of New Jersey Application July 26, 1940, Serial No. 347,708

24 Claims. (Cl. 12—17)

This invention relates to machines for operating upon soles and is herein illustrated and described as embodied in a lip-cutting and scoring machine of the type disclosed in United States Letters Patent No. 1,113,544, granted October 13, 1914, upon the application of Miller Cook, Jr. Such machines are employed for the purpose of forming incisions upon the flesh surfaces of insoles to define the termination of the channel lips and at the same time to impress size markings and other indications upon the grain surfaces of the insoles.

It is an object of the present invention to provide an improved machine of the type under consideration. The lip cutting and scoring machine illustrated in the drawings is provided with a work table upon which is placed an insole, grain side downward, with the heel end of the sole engaging an adjustable heel gage. Associated with the work table are various dies for marking size, width and other symbols and for forming lines of indentation upon the grain surface of the sole. The sole is not only centered but is also alined with relation to these marking devices by a gage mechanism comprising two pairs of gage fingers engageable with the lateral edges of the sole. These gages are carried by a normally raised head and are yieldingly brought into contact with the sole while the head is being urged downwardly. The ends of the gages, as the head descends, are first brought into contact with the work table, and the gages then yield to permit further descent of the head. The ends of the gages, during such further descent of the head, slide along the surface of the work table to enable the gages to be brought into engagement with the sole. Each pair of gage fingers is mounted upon a swivel block, and each swivel block is mounted upon a slide, the two slides being movable in a common guideway toward each other in a direction transverse with respect to the sole. These swivel blocks carry also the knives for making the lateral cuts which determine the ends of the channel lips. Each knife is therefore gaged laterally of the sole and is also alined with respect to the adjacent lateral edge of the sole by the two gage fingers carried by its swivel block. Thus, as the sole is being centered and alined with respect to the marking devices, the two knives are being positioned and alined with respect to the sole. These knives operate upon the sole during the descent of the head and after the sole has been centered and alined by the gages. The head also carries presser members for pressing the sole against the marking devices. The descent of the head is caused by a cam operating through a toggle mechanism. The slides which carry the swivel blocks are yieldingly urged toward each other by mechanism operated from another cam upon the same cam shaft.

The several features of the invention, including details of construction and the arrangement of parts, will now be more particularly described with reference to the accompanying drawings, in which Fig. 1 is a side elevation of the machine;

Fig. 2 is a plan view of the machine;

Fig. 3 is an enlarged side elevation of the clutch mechanism as seen when looking toward the right-hand side of the machine;

Fig. 4 is a front elevation of the machine;

Fig. 5 is a sectional view in side elevation of the lower portion of the machine showing gaging and marking mechanism;

Fig. 6 is a plan view of parts shown in Fig. 5;

Fig. 7 is a section taken on the line VII—VII of Fig. 6;

Fig. 14 is a plan view partly in section showing the edge gage carriers;

Fig. 15 is a plan view illustrating the manner of presenting a sole to the edge gages;

Fig. 16 is an elevational view partly in section showing the mechanism for operating the edge gages;

Fig. 17 is a plan view showing the edge gages after they have been brought into engagement with a sole;

Fig. 18 is a view similar to Fig. 17 showing a special arrangement of gages for an orthopedic insole;

Fig. 22 is a front elevation partly in section showing the knives and their carriers;

Fig. 23 is a bottom plan view of the parts shown in Fig. 22;

Fig. 24 is a section taken on the line XXIV—XXIV of Fig. 22;

Fig. 25 is a plan view showing the flesh surface of the heel end of an insole after the operation has been performed;

Fig. 26 is a plan view showing the grain surface of the heel end of an insole after the operation has been performed;

Fig. 27 is a perspective showing of a special knife;

Fig. 28 is a bottom plan view of the knife shown in Fig. 27 attached to its carrier block;

Fig. 29 is a plan view of a portion of a sole after having been operated upon by the knife shown in Fig. 27;

Fig. 30 is a plan view of the flesh surface of a so-called Uni-channel insole after having been operated upon by a special knife arrangement;

Fig. 31 is an edge view of the sole shown in Fig. 30;

Fig. 32 is a side elevation partly in section showing a special knife arrangement for performing the operation indicated in Fig. 30;

Fig. 33 is a front elevation partly in section of the special knife arrangement shown in Fig. 32;

Fig. 34 is a bottom plan view of the knife arrangement shown in Figs. 32 and 33.

Figure 1:
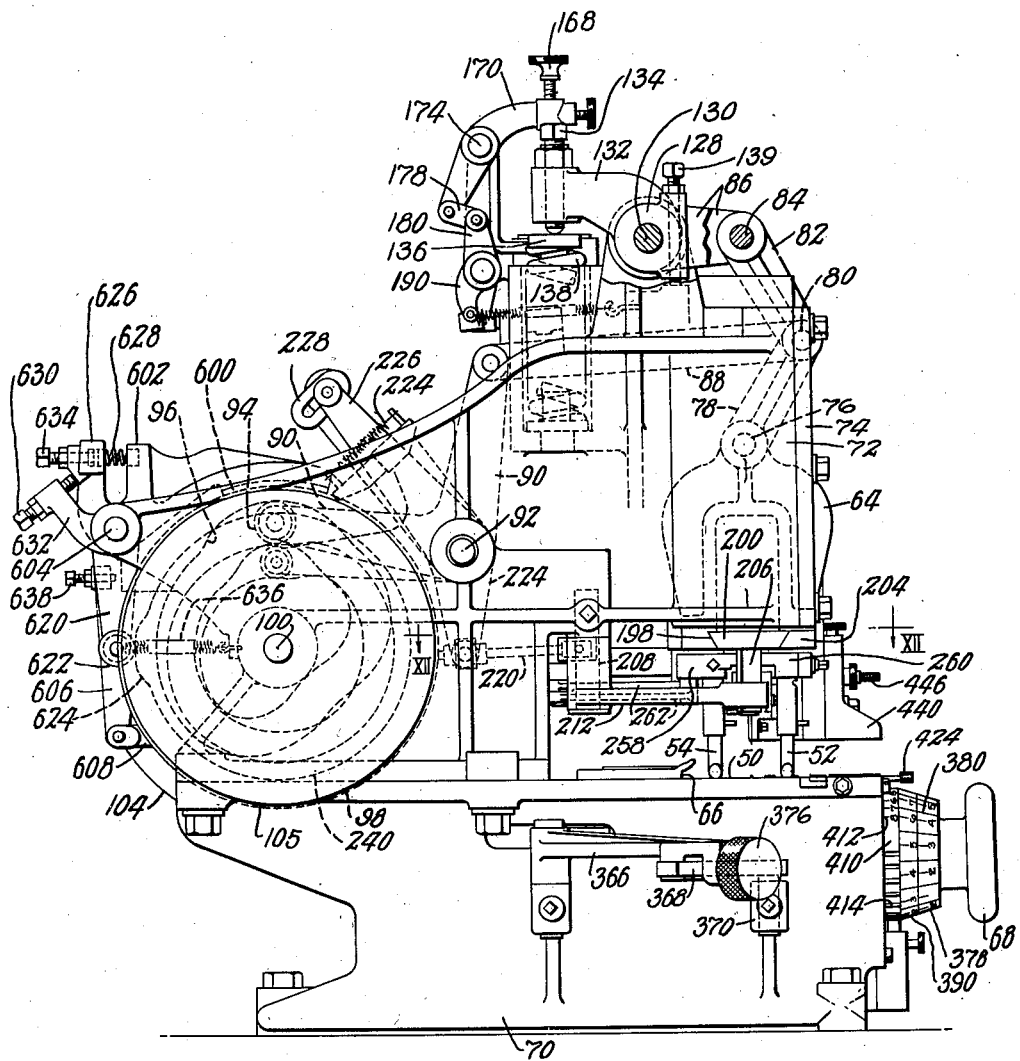

Referring to Figs. 1 and 4, the illustrated machine is provided with a work table 50 having a sole-supporting surface upon which an insole S with its flesh surface uppermost is centered and alined by two gage fingers 52 and 54 engageable with one of the lateral edges of the sole and by two other gage fingers 56 and 58 (Figs. 15 and 17), engageable with the opposite lateral edge of the sole. The sole S, for purposes of better illustration, is shown herein as already channeled, but in actual practice the sole is usually not channeled until after the performance of the operations for which this machine is intended. Associated with the work table 50 are various marking or impressing devices which later will be described more fully for operating on the under or grain surface of the sole S. The machine is provided also with a pair of knives 60 and 62 for making incisions in the upper or flesh surface of the sole S to define the terminations of the channel lips. The knives and gages abovementioned together with presser members for urging the sole against the marking and impressing devices are all carried upon a head 64 which is caused to perform a downward operating movement. The work table 50 constitutes the upper portion of a housing 70 which constitutes the base of the machine and upon which is rigidly secured an upper frame portion 72.

Figures 19, 20, 21:
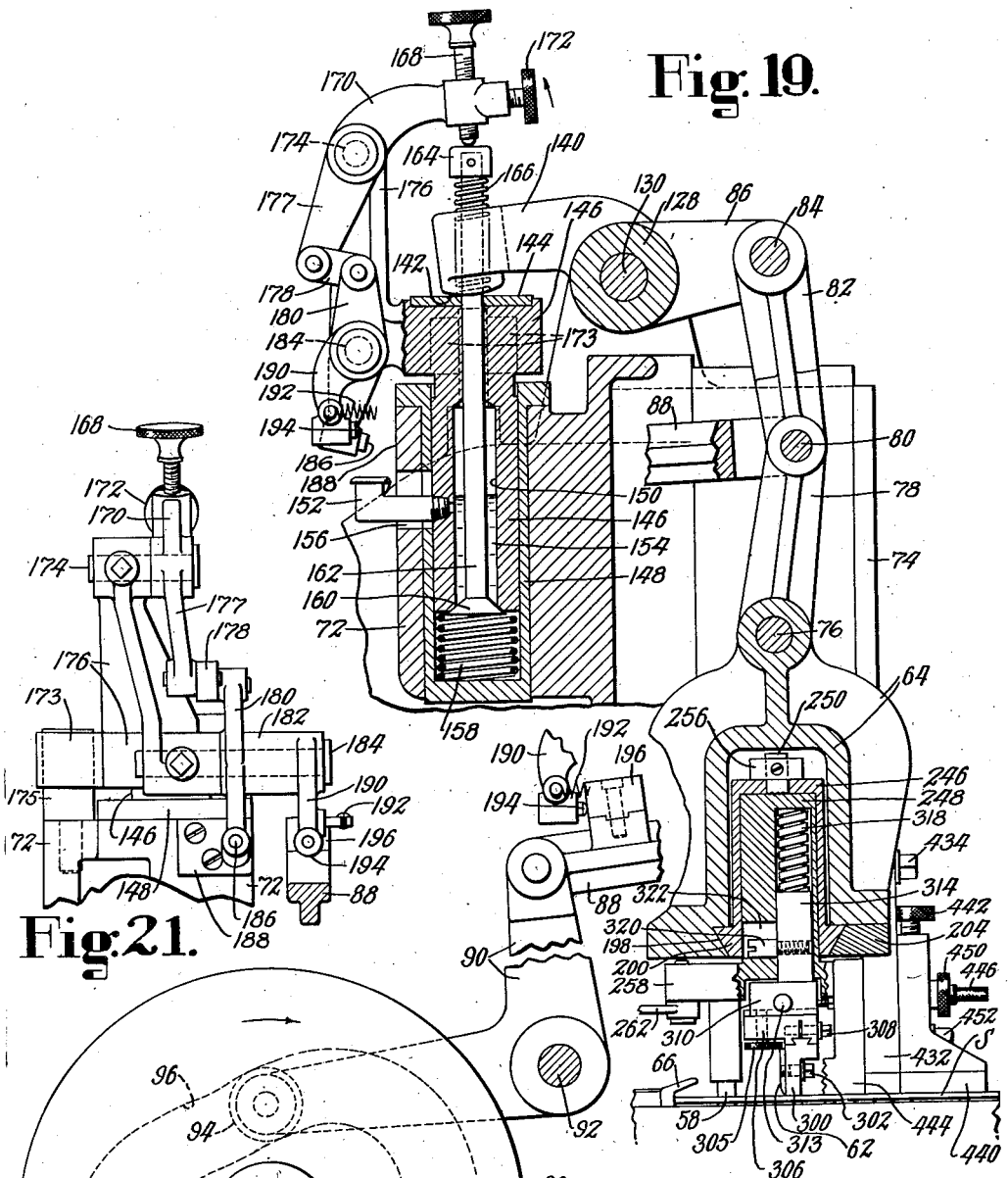
Fig. 19 is an elevational view partly in section illustrating the mechanism for applying pressure to the operating devices.
Fig. 20 is an elevation of the cam mechanism for operating the parts shown in Fig. 19.
Fig. 21 is a rear elevation of a portion of the mechanism shown in Fig. 19.

The head 64 (see also Fig. 19) is slidable up and down in a guideway formed in the upper frame 72 and is retained in the guideway by a pair of gibs 74. A tension spring 75 (Fig. 4) attached to the head and anchored in the frame 72 counterbalances the weight of the head. Pivotally mounted upon a pin 76 carried by the head 64 is a toggle link 78, the upper end of which is pivotally connected through a pin 80 to one end of a second toggle link 82. The opposite end of the link 82 is pivotally connected through a pin 84 to an abutment in the form of a pair of parallel rocker arms 86 against which a downward thrust may be developed upon the head 64 by the straightening of the toggle. Pivotally connected to the pin 80 is the forward end of a link 88 the rearward end of which is connected to one arm of a bell crank 90 (Fig. 20). A pin 92 secured in the frame 72 provides a fulcrum about which the bell crank 90 may rock. The bell crank is provided with a second arm which carries a cam roll 94 engaging a groove 96 in a face cam 98 which is secured upon a shaft 100. Rotation of the shaft 100 is controlled through a one-revolution clutch by a treadle connected through a rod 102 (Figs. 2 and 3) to the clutch mechanism. The power is obtained from a pulley 104 (Fig. 2) loosely mounted on the shaft 100 and driven by a belt or other suitable means from any convenient source of power. The construction of the clutch mechanism will later be described. Secured upon the shaft 100 is a hand wheel 105 which enables the shaft to be turned slowly for purposes of testing and adjustment.

The abutment comprising the rocker arms 86 is not fixed at the beginning of the operation but may yield upwardly to an extent determined by the thickness of the sole S. The arms 86 are integral with a hub or sleeve 128 which is rotatable upon a stationary pin 130 secured in the frame 72. Extending rearwardly from the hub 128 is another arm 132 (Fig. 1) through the end of which is threaded a contact or abutment screw 134. The lower end of the screw 134 engages a plate 136 supported by the upper end of a compression spring 138, the force of the spring being adjustable by turning of the screw 134. The lower end of the spring 138 rests against the bottom of a well-like housing formed in the frame 72 to enclose the spring. The thrust of the spring 138 urges the arms 86 in a clockwise direction, as viewed in Fig. 1, to a stop position determined by a screw 139 adjustably threaded through a boss in the hub 128, the end of the screw being engageable with a surface 141 (Fig. 4) formed on the frame 72.

Extending rearwardly from the hub 128 is still another arm 140 (Figs. 19, 4 and 2) having a bearing surface 142 engageable with the upper surface of a bearing plate 144 carried by a plunger 146. A cylinder 148 secured in the frame 72 slidably receives the plunger 146. The lower portion of the plunger 146 has formed in it an axial bore 150 which normally is open to the space within the cylinder below the plunger. Carried by the plunger 146 and having a passage which communicates with the bore 150 is an L-shaped fitting 152 which is used as a filler through which a non-compressible liquid 154 such as oil may be introduced into the bore 150 and into the space within the cylinder beneath the plunger. The filler 152 serves also as a gage to indicate whether sufficient liquid is present. A slot 156 in the lateral wall of the cylinder 148 and in the adjacent portion of the frame 72 accommodates the upward and downward movements of the filler 152. A compression spring 158 interposed between the lower end of the plunger 146 and the bottom of the cylinder 148 urges the plunger upwardly to maintain the bearing plate 144 in engagement with the surface 142. The spring 158 is considerably weaker than the spring 138.

Communication between the bore 150 and the space below the plunger 146 may be closed by a conical valve 160 carried upon the lower end of a stem 162. The upper portion of the plunger 146 and the bearing plate 144 are bored to provide a sliding fit for the stem 162, and the end of the arm 140 is bifurcated to avoid interference with the stem 162. Interposed between the plate 144 and a cap 164 secured upon the upper end of the stem 162 is a compression spring 166 which surrounds the stem 162 and which tends to move the valve into closing position. The valve is normally held open by a screw 168, the lower end of which engages the cap 164. The screw 168 (see also Fig. 21) is adjustably threaded through an arm 170 and is secured in adjusted position therein by a binding screw 172. The arm 170 is fulcrumed upon a pin 174 carried by an offset bracket 176 extending upwardly from the plunger 146. A pair of ears 173 (see also Fig. 2) extending laterally from the bracket 176 and engaging opposite surfaces of a stationary rod 175 extending upwardly from the frame 72 prevent rotation of the plunger 146 in the cylinder 148. A downward extension 177 of the arm 170 is pivotally connected to one end of a link 178, the opposite end of the link 178 being pivotally connected to an arm 180 extending from a hub 182 which is fulcrumed upon a pin 184 secured in the bracket 176. The lower portion of the arm 180 (Fig. 21) extends below the hub 182 and carries a stop member 186 which is engageable with a stationary stop 188 secured upon the frame 72. Also extending downwardly from the hub 182 is an arm 190 to which is secured one end of a tension spring 192. The opposite end of the spring 192 is secured to the frame 72 and the effect of the spring 192 is to hold the stop member 186 normally against the stop 188 in which position the screw 168 is adjusted so as to be in contact with the cap 164 to hold the valve 160 open. Carried by the lower end of the arm 190 is an abutment 194 (Fig. 20) which is engageable by a block 196 secured upon the link 88.

Now, it is evident that when the machine is started the link 88 will be drawn to the left, as seen in Figs. 1 and 19, tending to straighten the toggle links 82 and 78 until pressure is developed upon the sole S by presser members, yet to be described, carried by the head 64. As such pressure is developed, the spring 138 will yield enabling the pin 84 to rise slightly. During this portion of the operation the valve 160 is open, permitting the liquid 154 to flow into the bore 150 as the plunger 146 descends, and the pressure exerted upon the sole depends upon the spring 138, being greater or less according to the adjustment effected by the screw 134. This pressure, in view of the relatively great length of the spring 138 as compared with the small range of variation of sole thickness, will be substantially independent of the thickness of the sole. However, as soon as the block 196 engages the contact member 194 the valve 160 will be closed and none of the liquid trapped below the plunger 146 will be permitted to escape into the bore 150. The arms 86 are thus locked positively against further upward movement and the pressure exerted through the toggle by the further rearward movement of the link 88 is positive.

Figure 12:
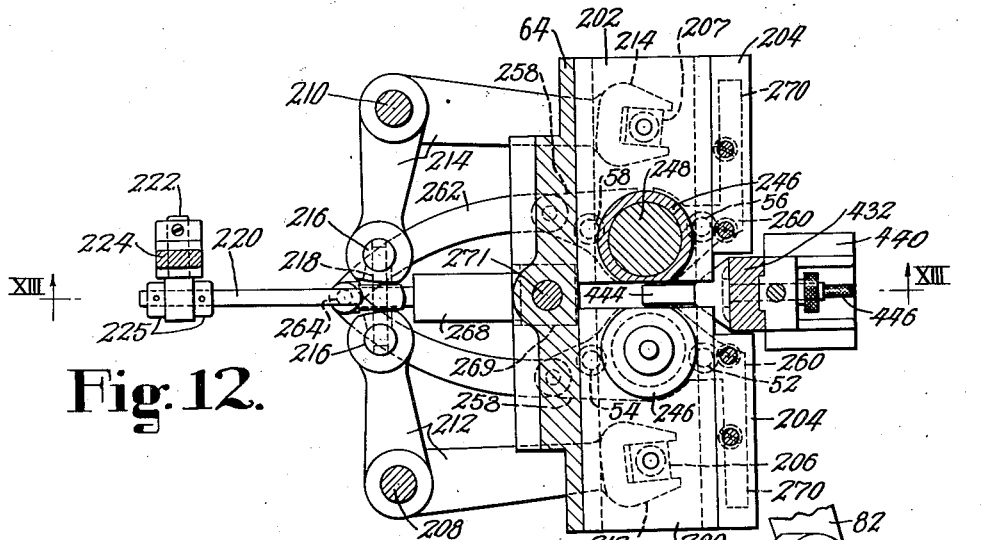
Fig. 12 is a plan view partly in section taken on the line XII—XII of Fig. 1.
Figure 13:
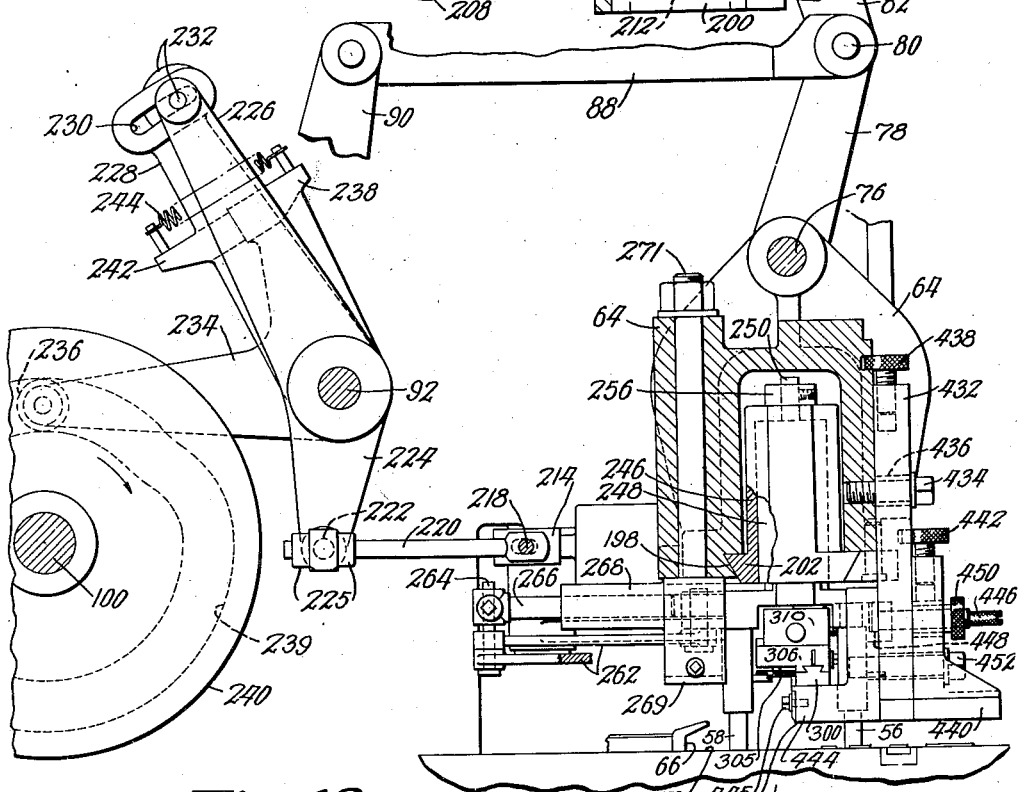
Fig. 13 is a section in elevation taken on the line XIII—XIII of Fig. 12.

An arrangement for adjustably mounting the edge gages and knives upon the head 64 will now be described. Formed in the lower end of the head 64 is a guideway 198 (Figs. 1 and 19) in which are slidably mounted a pair of dovetail blocks 200 and 202 (Fig. 12). The guideway 198 extends transversely of the machine and the blocks 200 and 202 are retained therein by gibs 204. Pivotally secured to and extending downwardly from the blocks 200 and 202 are square rods 206 and 207 respectively. Fulcrumed upon a pair of upright pins 208 and 210 secured in the frame 72 are a pair of bell-crank levers 212 and 214 respectively. The lever 212 has an arm one end of which is slotted for engagement with the rod 206 while the lever 214 has an arm which is slotted for engagement with the rod 207. The other arms of the respective bell-crank levers extend toward each other, each arm having rotatably mounted therein a cylindrical block 216 having a vertical axis. The two blocks 216 have diametrical holes which slidably engage the opposite end portions of a cross bar 218 secured upon the end of a link 220 (see also Fig. 13). The opposite end of the link 220 is connected through a pivot 222 to the lower end of an arm 224 of a bell-crank fulcrumed upon the pin 92. A pair of thrust collars 225 slidably mounted on the link 220 and securable thereupon in desired positions of adjustment engage opposite sides of the pivotal connection 222 and thus enable the effective length of the link 220 to be adjusted. The bell crank has a second arm 226 (Figs. 13 and 16) the outer end of which may be clamped in any desired position of relative angular adjustment about the pin 92 to another arm 228 which is also rotatable about the pin 92. The arrangement for clamping the two arms together comprises an arcuate slot 230 formed in the outer end of the arm 228 and a clamping screw 232 extending through the slot 230 and threaded into a boss in the arm 226. Also fulcrumed upon the pin 92 is a bell crank 234 one arm of which carries a cam roll 236 and the other arm of which carries an abutment 238. The roll 236 engages a groove 239 formed in a face cam 240 secured upon the shaft 100. The abutment 238 engages a corresponding abutment 242 formed on the arm 228, the two abutments being held normally in engagement by a tension spring 244 interposed between them.

The normal position of the slides 200 and 202 is one of relative separation. When the machine is started the rotation of the cam 240 will rotate the bell crank 234 in a clockwise direction as a result of which the spring 244 will also urge the arm 228 and the arm 226 in a clockwise direction, tending to draw the link 220 rearwardly. As shown in Fig. 12 such rearward movement of the link 220 will rotate the bell cranks 212 and 214 about their respective fulcra to move the slides 200 and 202 toward each other with reference to a common center line. This center line is transverse with relation to the direction of the guideway 198 and longitudinal with respect to the machine and is half way between the axes of the fulcrum pins 208 and 210. This common center line is also half way between the axes of the pivotal mountings between the square rods 206 and 207, and their respective slides 200 and 202.

Extending upwardly from each of the slides 200 and 202 is a hollow boss 246 (Figs. 13 and 19) the interior of which is cylindrical, opening through the lower surface of the slide. Mounted for rotation within each of the bosses 246 is a cylindrical swivel block 248. Each of the blocks 248 is retained within its respective boss by a stem 250 extending upwardly through the top of the boss and having secured upon its outer portion a retaining collar 256. Each of the blocks 248 extends below the slide in which it is carried, the lower portion of each block being in the form of a horizontal plate-like extension having a rearward portion 258 (Figs. 12 and 14) and a forward portion 260. Pivotally connected respectively to the rearward portions 258 are a pair of links 262, the opposite ends of which are pivotally connected to each other through an upright pin 264 (see also Fig. 13). The pin 264 is secured in the end of a horizontal slide rod 266 which is guided for movement forwardly and rearwardly along the longitudinal center line of the machine by a guideway 268 carried by a block 269 which is rigidly secured by a bolt 271 to the head 64. It is evident that, as a result of such connection between the swivels 248, any angular movement of one of the swivels will be accompanied by a corresponding and oppositely directed movement of the other swivel and that this will be true regardless of the degree of separation of the slides 200 and 202.

The edge gages 52, 54, 56, and 58 are mounted upon the swivels 248 in the following manner. The gage 52 is secured in a bore formed in the lower surface of the forward extension 260 of the swivel carried by the slide 200, and the gage 54 is similarly secured in the rearward extension 258 of the swivel on the same slide; the gages 56 and 58 are similarly secured to the forward and rearward extensions respectively of the swivel 248 carried by the slide 202. The two gages 52 and 56 when thus secured in their normal positions are always symmetrical to each other with respect to the longitudinal center line of the machine, and the gages 54 and 58 are likewise symmetrical to each other. However, an unsymmetrical relation of the gages 52 and 56 may sometimes be desirable, as in the case of operations upon specially shaped insoles (Fig 18) such as are used for orthopedic purposes. To provide for such cases each of the forward extensions 260 has a laterally extending portion 270 in which is formed a horizontal laterally extending guideway 272 (Fig. 4). A block 274 (Fig. 14) may be slidably mounted with provision for lateral adjustment in either of the guideways 272, or a pair of such blocks may be secured in the respective guideways. Each of these blocks has a bore for engagement with a downwardly extending gage member 276 similar in all respects to the edge gages above mentioned.

The swivels are normally free to turn, their freedom being limited, however, by a pin 263 depending from each of the slides 200 and 202 and engaging a slot 265 formed in the plate-like extension of the corresponding swivel. These pins, while permitting the maximum range of movement required for gaging, prevent the gages from assuming extreme positions prior to the introduction of a sole.

The edge gages 52, 54, 56, 58, and 276 are all similar except as hereinafter noted. They each consist of a cylindrical barrel 278 (Figs. 4 and 32) which extends upwardly into one of the bores above mentioned, being clamped therein by a set screw 282. Slidably mounted within each of these barrels is a cylindrical plunger 284 the lower end portion of which is engageable with the lateral edge of the sole S. The plunger 284 is urged downwardly by a compression spring 286 housed within the barrel 278 and interposed between the closed upper end of the barrel and the inner end of the plunger 284. Each plunger is retained in its respective barrel by a screw 288 extending outwardly from the plunger through a slot 290 formed in the wall of the barrel. The engagement of the screw 288 with the closed lower end of the slot 290 prevents the plunger from being forced out of the barrel. These screws serve also to hold the plungers from relative turning movement with respect to their barrels. The upper portion of each slot 290 has a bayonet-like offset 292 whereby the plunger may be latched in upward position by turning the plunger to bring the screw within the offset. The gages 52 and 54 are in all respects identical and the gages 56 and 58 are likewise in all respects identical. The gages 56 and 58, however, differ from the gages 52 and 54 in that the slots 290 of the gages 56 and 58 are considerably shorter than the corresponding slots of the other gages. These shorter slots in the gages 56 and 58 insure that the gages when the slide 64 is in its upper or normal position will be sufficiently above the level of the work table 50 to enable soles to be moved laterally beneath them into engagement with the gages 52 and 54, the direction of such movement of the sole being indicated by the arrow 293 in Figs. 15 and 4. In order to facilitate such lateral movement, the lower ends of the gages are beveled as indicated by the reference character 294.

The knives 60 and 62 are both alike and are used to make the straight cuts 296 and 298 (Fig. 25) which define the terminations of the channel lips of the ordinary double-lipped insole. Each knife is secured to a separate block 300 (Figs. 19, 22 and 23) by a clamping screw 302 passing through a vertical slot formed in the block 300 to permit heightwise adjustment of the knife relatively to the block. The adjusted position of the knife is determined by a screw 305 threaded into one of a pair of blocks 306 and having a head which is in abutting engagement with the shank of the knife. The thrust which causes the knife to operate is thus transmitted directly through the screw 305. Each block 300 has an under surface which bears upon the face of the insole to limit the depth to which the knife can cut in accordance with the heightwise adjustment above mentioned, such adjustment being made ordinarily to enable the knife to cut through the thickness of the material which is to form the channel lip without cutting to any appreciable extent into the base of the channel. Each block 300 has a dovetail sliding connection with its associated block 306 to which the block 300 may be clamped by a screw 308 in any desired position of adjustment laterally of the machine. Each block 306 in turn has a sliding dovetail connection with one of a pair of blocks 310 in which the respective blocks 306 may be clamped in any desired positions of adjustment longitudinally of the machine by screws 312 cooperating with pins 313. The blocks 310 each have an upwardly extending cylindrical stem 314, which stems are slidably received within bores 316 formed in the cylindrical blocks 248, respectively. Housed within each bore 316 and interposed between the inner end of the bore and the upper end of the corresponding stem 314 is a compression spring 318 which urges the stem 314 downwardly. Such downward movement of the stem 314 is limited by the engagement of a screw 320 extending radially from the stem 314 and engageable with the lower end of a slot 322 formed in the cylindrical block 248. The screw 320 also engages the sides of the slot 322 to prevent relative rotation of the stem 314 within the bore 316. The above-described arrangements for mounting the knives are similar for both of the knives 60 and 62 and the same reference numbers have been used in describing the corresponding parts associated with each of the knives.

The heel gage 66 which determines the position of the insole longitudinally on the machine is clamped against the upper surface of a block 324 (Figs. 5, 6, and 7) by a nut 326 threaded upon a stem 327 extending upwardly from the block. The stem 327 passes through a longitudinal slot 328 formed in the gage 66 to permit a longitudinal adjustment of the heel gage with respect to the block. The block 324 extends upwardly through a slot 330 formed in the work table 50, the lower portion of the block 324 being secured to a slide 329 movable along a guideway formed in a second slide 331. A guideway for the slide 331 is formed in the under surface of the work table 50, and a pair of gibs 333 retain the slide 331 in this guideway. Both guideways extend longitudinally of the machine. Projecting downwardly from the slide 329 through a slot in the slide 331 is a stem 332 which carries a roll 334. A cylindrical cam 336 has formed in its periphery a helical groove 338 which is engaged by the roll 334 to move the gage 66 longitudinally when the cam is rotated. The cam 336 is slidably keyed by a key 346 upon a shaft 340 which is both rotatable and axially slidable in bearings 342 and 344 carried by the machine housing 70. The hand wheel 68 is rigidly secured by a pin 348 to the forward end of the shaft 340. While the cam 336 as so far described is free to move axially along the shaft 340, means are provided for holding the cam in any desired position of axial adjustment. To this end there are provided a pair of abutments 352 and 354 depending from the slide 331 and engaging the respective ends of the cam 336 to prevent endwise movement of the cam. Connecting the lower ends of the abutments 352 and 354 is a longitudinal member 356 from which a pin 358 extends upwardly. Pivotally mounted upon the pin 358 is a square block 360 which is engaged by the slotted end of an arm 362 pivotally mounted upon an upright pin 364 secured in a bracket extending from the housing 70. Integral with the arm 362 is an arm 366 (Figs. 1, 2 and 4) which may be moved by the operator to adjust the cam 336 longitudinally. The outer end portion of the arm 366 is slotted to engage a graduated sector 368 secured upon a bracket 370 extending from the lateral wall of the housing 70. Formed on the sector 368 are graduated scale markings 372 to indicate the adjustments of the cam. Interposed between the slotted end of the arm 366 and the sector 368 is a brass angle plate 374. Threaded into the outer end of the arm 366 is a screw 376 the inner end of which bears against the outer flange of the plate 374 to clamp the plate against the sector and thereby to hold the arm in any desired position of adjustment.

Figure 8:
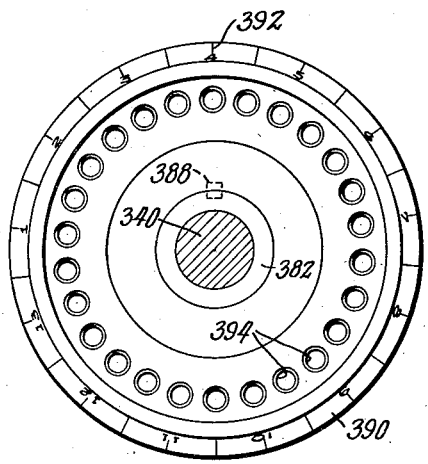
Figs. 8, 9, 10 and 11 are sections taken on the corresponding lines marked on Fig. 5.
Figure 9:
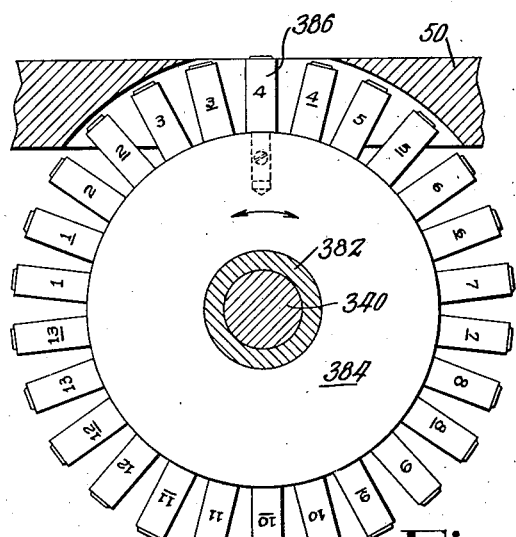

The illustrated machine is provided with size indicating and marking means operated by the hand wheel 68 which adjusts the heel gage. Fixed upon the forward end portion of the shaft 340 by the pin 348 and adjacent to the hand wheel 68 is a dial 378 (Figs. 5 and 6) having scale markings 380 which indicate the sizes of soles. Freely rotatable upon the shaft 340 is a sleeve 382 (Figs. 5 and 9) which carries a disk 384. Extending from the periphery of the disk 384 are a plurality of dies 386 (see also Fig. 6) adapted to print numbers 387 (Fig. 26) indicative of size upon the under surface of the sole S. A slot 385 is provided in the work table 50 to render the sole accessible to the size marking dies 386 and also to width marking dies later to be described. Secured upon the sleeve 382 against rotation and against axial movement by a key 388 is a second dial 390 (Figs. 5, 6 and 8) adjacent to the dial 378. Formed upon the dial 390 are scale markings 392 which also indicate sizes. The purpose of the second dial is to enable the size indications of the first dial to be employed upon soles of varying style wherein the actual position of the gage 66 should be different notwithstanding that soles are the same in nominal size. To provide a relative adjustment between the dial 378 and the dial 390 there are formed in the dial 390 a plurality of openings 394 any one of which may be engaged by a pin 396 secured in the dial 378 and extending rearwardly therefrom. In order to effect such adjustment the operator may pull the hand wheel 68 forwardly to disengage the pin 396 from any particular opening 394, rotate the hand wheel to the desired extent, and then return the hand wheel to its normal position. In order to maintain the shaft 340 in such normal position, there is provided a compression spring 398 surrounding the rear or inner end of the shaft 340 and interposed between the bearing 342 and a collar 400 secured upon the end of the shaft.

Where only small adjustments of the position of the heel gage 66 are required as in operations upon soles of the same general type, although in different styles, the above-mentioned relative adjustment of the dials 378 and 390 will be sufficient. When, however, a relatively large adjustment is required as between soles used in shoes of widely different types, for example shoes having Louis heels and shoes having Cuban heels, the adjustment of the lever 366 will be employed.

Figure 10:
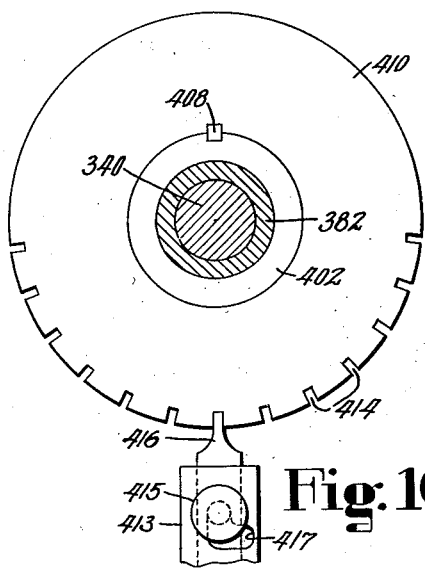
Figure 11:
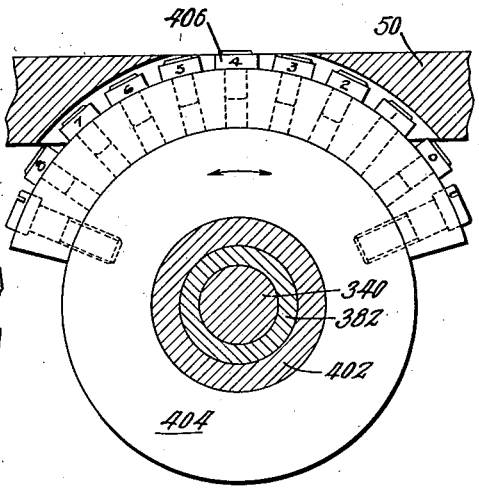
Figure 35:
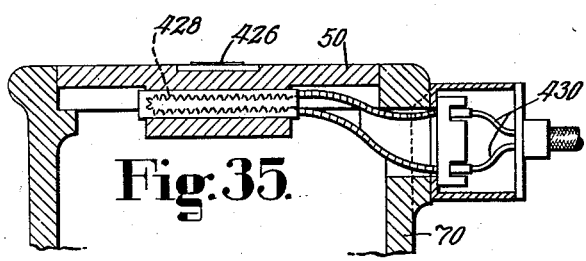
Fig. 35 is a sectional view in elevation showing an arrangement for heating the marking dies.

The illustrated machine is provided also with width indicating and marking means. Surrounding the sleeve 382 and freely rotatable thereupon is a sleeve 402 (Figs. 5 and 11) from which extends a disk 404 carrying a plurality of dies 406 extending radially therefrom and adapted to impress markings 407 (Fig. 26) indicative of width upon the under surface of the sole S. Secured upon the sleeve 402 against rotary and axial movement relatively thereto by a key 408 is a dial 410 (Figs. 5, 6, and 10) having scale markings 412 to indicate the various widths of soles. Formed in the lower half of the periphery of the dial 410 are a plurality of notches 414 which are engageable by the upper end of a spring-pressed plunger or detent 416 to hold the dial in any desired position wherein the appropriate width marking will be engageable with the under surface of the sole. The detent 416 is slidable in a barrel 413, and is provided with a knob 415 extending through a bayonet slot 417 in the barrel to enable the detent to be retracted and latched in inoperative position. The dial 410 then will turn freely when the hand wheel 68 is turned, because of frictional engagement with the dial 390. The proper setting of the width marking die is, therefore, made first, and after the dial 410 has been latched in the desired position the adjustment for size may be made. No latch is necessary for the dial 390 because the frictional engagement of the dial 410 holds it in adjusted position. The desired scale mark 412, which has been brought uppermost and which after the dial 410 has been latched always occupies the same definite position, serves as a reference for the scale marks 392 of the dial 390. It may be noted that the adjacent faces of the disks 384 and 404 are in sliding engagement with each other, and that both are restrained from forward movement with the shaft 340 by the engagement of the disk 404 with the edge of the slot 385. In addition to the above provision for size and width markings, the machine is provided with other devices for impressing the under surface of the sole. One of these devices consists of a die 418 (Figs. 6 and 15) which may be set into a groove in the work table 50 and which is shaped to provide a line of indentations 419 (Fig. 26) extending laterally on the grain surface of the sole S to indicate the position where the channel lips terminate on the flesh surface of the sole. The knives 60 and 62 are preferably adjusted slightly to the rear of the die 418 to provide clearance. Another impressing device consists of a slide 420 (Figs. 5 and 6) guided in a transverse groove in the work table 50 and having dies 422 adapted to print various identifying symbols 423 (Fig. 26) such as the manufacturer's monogram, etc. The slide 420 is retained in any desired position of adjustment by a spring-pressed detent 424 engageable with a series of notches in the slide. The slide 420 may be used to print width markings in letters, in which case the disk 404 is turned to bring all the numbered dies 406 out of operating position. Another marking device may consist of a die 426 which fits into a recess in the work table and is adapted to make the union stamp 427 (Fig. 26) on the grain surface of the sole. If desired the marking dies may be heated by a resistance coil 428 (Fig. 35) secured in heat conducting relation against the under surface of the work table 50 and supplied with current through leads 430.

In order to provide for pressing the sole S against the various dies a presser member 432 (Fig. 13) is directly secured to the head 64 by a clamping screw 434 extending through a vertical slot 436 in the presser member to accommodate heightwise adjustment. Such adjustment is effected when the clamping screw 434 is loosened by turning a screw 438 threaded into the upper end of the presser member 432 and having a head which engages a notch formed in the head 64. The lower end of the presser 432 is directly over the monogram die 422 and supplies the pressure by which that die operates. Secured for heightwise adjustment in a vertical guide formed in the presser 432 and extending forwardly thereof is a presser 440 the lower end of which serves to press the sole S into engagement with the union stamp 426. Such heightwise adjustment of the presser 440 is effected by turning a screw 442 having a head engageable with the notch formed in the presser 432. In order to press the sole against the size and width marking dies and also against the indenting die 418, there is provided a third presser member 444 extending rearwardly of the presser 432 and slidable for heightwise adjustment in a vertical guideway formed therein. Such adjustment is effected by turning a pin 446 having a slotted end accessible to the operator and journaled in the presser 432. Formed upon the rear end of the pin 446 is an eccentric 448 which is engageable with a horizontal slot formed in the adjacent face of the presser 444. It is evident that turning of the pin 446 will thus serve to raise or lower the presser 444 relatively to the presser 436. The pin is externally threaded to receive a lock nut 450 which bears against the forward face of the presser 432. The presser 440 is provided with a heightwise slot which provides ample clearance for the pin 446 and nut 450. In order to secure the pressers 440 and 444 to the presser 432 in their adjusted positions, there is provided a clamping bolt 452 threaded into the presser 444 and extending through the pressers 432 and 440. When the bolt 452 is turned pressure is exerted upon the presser 444 which binds all three pressing members together.

Clamped for heightwise adjustment upon the rear face of the presser 444 by a screw 445 is an indenting tool 451 (Fig. 13) for marking a line of indentations 453 (Fig. 26) on the flesh surface of the sole to indicate the position of the heel-breast line.

The clutch mechanism above mentioned comprises a hub 106 (Figs. 2 and 3) secured upon the shaft 100 and having a longitudinal groove 108 in which a clutch pin 110 having a shoulder which extends radially out of the groove is slidably urged toward the pulley 104 by a spring 112. The pulley 104 has a hub 114 in which is formed a notch (not shown) capable of receiving the end of the pin 110. The clutch pin, however, is normally held out of engagement with the notch by an arm 116 having a beveled end portion 118 engageable with the outwardly extending shoulder of the clutch pin. The arm 116 is fulcrumed upon a stud 120 secured in the frame 72, and has a tail 122 to which is pivotally secured the upper end of the treadle rod 102. A tension spring 124 normally holds the treadle rod up and the end portion 118 of the arm 116 down in engagement with the hub 106. Depression of the treadle releases the clutch pin 110 and enables it, when rotation of the pulley has brought the notch in the hub 114 into register, to enter the notch and thus transmit rotation from the pulley to the shaft. Release of the treadle enables the beveled end portion 118 to descend and engage the shoulder of the clutch pin 110 which, as the shaft 100 rotates, rides up the bevel and brings the end of the key out of clutching relation with the notch in the hub 114, thereby releasing the shaft 100 from the pulley 104.

Associated with the above-described clutch mechanism is a braking device comprising a brake shoe 600 (Fig. 1) carried upon an arm 602 and engageable with the periphery of the cam 98. The arm 602 is secured upon a shaft 604 journaled in bearings supported on the frame 72. Secured also upon the shaft 604 is a depending arm 606 (see also Fig. 3) which is connected by a link 608 to the lower end of a lever 610 fulcrumed upon a pin 612 secured in the frame 72. The connection between the arm 606 and the link 608 comprises a pin 607 carried by the arm and engaging a slot 609 formed in the link to provide a limited amount of lost motion. The upper end of the lever 610 is notched for engagement with a roll 614 carried by an arm 616 depending from the tail 122. The roll 614 is mounted on a stud which extends inwardly toward the frame 72 and engages the opposite walls of a slot formed in a bracket carried by the frame to limit movement of the treadle in both directions. This stop arrangement holds the arm 116 off the hub 106. In the normal or upper position of the treadle the brake shoe 600 is in operative engagement with the periphery of the cam 98 to oppose rotation of the shaft 100. Depression of the treadle rocks the arm 616 in a counterclockwise direction, as viewed in Fig. 3, which causes the lever 610 and therefore the pin 604 to rock in a clockwise direction. These directions will appear reversed in Fig. 1, and it is thus evident that depression of the treadle will release the brake shoe 600 from the periphery of the cam 98. Mounted for free rotation upon the shaft 604 is a sleeve 618 (Fig. 2) from which depends an arm 620 carrying at its lower end a roll 622 (Fig. 3). Formed upon the periphery of the cam 240 is a raised portion 624 which engages the roll 622 while the machine is at rest. Also secured to the sleeve 618 is an arm 626. A compression spring 628 interposed between the arms 626 and 602 tends to effect a relative separation of the arms angularly about the axis of the shaft 604. This angular separation of the arms is adjustably limited by a stop screw 630 threaded through an arm 632 secured to the shaft 604, the end of the screw 630 being engageable with an abutment surface formed on the arm 626. The degree of compression of the spring 628 may be adjusted by a screw 634. A tension spring 636 urges the arm 620 in a counterclockwise direction, as viewed in Fig. 1, as far as permitted by a stop screw 638 threaded through a lug on the arm 620 and engageable with an abutment on the frame 72. The spring 636 thus operates through the screw 630 to urge the brake into releasing position, but is normally prevented from doing so by the cam rise 624.

As has already been mentioned, the brake is released and the clutch is engaged to start rotation of the cam shaft by depression of the treadle. Such release of the brake takes place against the thrust of the spring 628, which yields while the arm 626 is held stationary by the cam rise 624 against the roll 622. The rotation of cam shaft almost at once carries the cam rise 624 out from under the roll 622, and the spring 636 draws the arm 620 inwardly and causes the arm 626 to retain the brake shoe in released position. The roll 622 is, however, prevented from riding upon the periphery of the cam 240 by the stop screw 638. The lost-motion slot 609 enables the treadle to rise upon release by the operator without affecting the braking device. Continued rotation of the cam shaft will once more bring the cam rise 624 under the roll 622 and positively rock the arm 620 against the tension of the spring 636 in a direction to cause the spring 628 yieldingly to urge the brake shoe into braking position. This occurs simultaneously with the release of the clutch mechanism at the termination of one complete revolution of the cam shaft.

The operation of the machine will now be described. When the machine is in its normal or rest position, the head 64 is up and the slides 200 and 202 are widely separated. In this position of the head, the edge gages 52 and 54 are yieldingly held down in engagement with the work table 50 by the springs 286 while the gages 56 and 58 are high enough above the surface of the work table to enable the sole S to be passed laterally beneath them into engagement with the gages 52 and 54 as best shown in Fig. 15. The operator having thus presented the insole to the gates 52 and 54 pushes the sole back far enough to cause the heel end to engage the gage 66 and thereupon depresses the treadle to start the automatic operation of the machine.

Rotation of the cams at once starts the link 88 moving rearwardly and causes the toggle links 78 and 82 to begin to straighten. Inasmuch as the spring 138 resists upward movement of the pin 84 the head 64 will be forced downwardly. Such downward movement of the head will bring the lower ends of the edge gage fingers 56 and 58 yieldingly into engagement with the surface of the work table 50. The rotation of the cams meanwhile is causing the slides 200 and 202 to move toward each other, carrying the two sets of edge gages with them. The edge gages 52 and 54 will thus move the sole laterally until the sole is engaged by one or the other or by both of the gages 56 and 58. If either gage comes into contact with the soles before the other, both sets of gages will rotate about the axes of their respective cylindrical blocks 248 until all four gage fingers are in engagement with the sole. The sole is thus centered and alined automatically with reference to the center line of the machine. While some soles such as that shown in Fig. 25 have lateral edges which are substantially parallel at the locality at which the cuts 296 and 298 are to be formed, there are many soles of which the lateral edges at this portion of the sole are not parallel. It will be observed that in either case the knives are oriented or alined by their respective gage fingers with reference to the direction of the edges of the sole. The cuts made by the knives of the illustrated machine are substantially perpendicular to the edges of the sole and this will be true however far the edges may depart from being parallel to each other. After the sole has been channeled and the channel lips have been raised and cemented together, the ends of the turned-up lips will therefore register with each other, and neither lip will extend rearwardly of the other to cause an undesirable bunchiness. It is evident from the foregoing description that while the sole is centered and alined with relation to the various devices for marking and indenting its under surface, the knives are positioned with reference to the lateral edges of the sole. As the head descends the springs 286 yield and maintain the ends of the gage fingers in slidable contact with the surface of the work table. It should be observed that the centering or alining of the sole and of the knives takes place before any of the members carried by the head 64 engages the upper surface of the sole.

Continued downward movement of the head causes the knives 60 and 62 to make the incisions above mentioned to a depth determined by the gaging under surfaces of the blocks 300. The various presser members 440, 432, and 444 then come into engagement with the upper surface of the sole, the spring 138 yielding to accommodate upward movement of the pin 84 as occasioned by the thickness of a particular sole being operated upon. However, as the link 88 nears completion of its rearward movement the block 196 engages the contact member 194 and causes the valve 160 to close thereby locking the pin 84 positively in whatever position it has assumed by reason of the thickness of the sole. Further rearward movement of the link 88, therefore, causes the various presser members to exert positive pressure through the sole to cause the various marking and indenting elements to perform their operations.

Continued rotation of the cam shaft returns all parts of the machine to rest position and automatically stops rotation of the cam shaft.

Certain alternative knife arrangements will now be described.

In some cases instead of merely making the incisions 296 and 298 (Fig. 25) in the channel lips it is desirable to remove a portion of each lip to facilitate the entry of a channel opening tool. Thus, for example, in Fig. 29 is shown a sole in which a triangular piece has been cut from each of the lips, leaving two triangular spaces 700. This is accomplished by substituting for the knives 60 and 62 a pair of knives which are both alike, being K-shaped in cross-section to provide a plurality of angularly disposed blade portions. Here again for convenience of disclosure the sole is assumed to have been already channeled, but in practice it will usually be found more convenient to make these incisions before channeling.

One of the K knives, shown in Figs. 27 and 28, is indicated by the reference numeral 702. Each knife 702 is ground to provide two pair of V- shaped cutting edges 704 at the ends of the corresponding blade portions. The knives 702 are secured upon the blocks 300 in the same manner as the knives 60 and 62. As shown in Fig. 19, the ends of the knives opposite the cutting edges are in abutting engagement with the heads of the screws 305. The axis of each screw 305 is between the two V's formed by the cutting edges of its associated knife, and each arm of the K thus bears against the head of the screw. The thrust of the screw is therefore transmitted directly through the knife to each of the four cutting edges 704. The knives 702, like the knives 60 and 62, are adjusted slightly to the rear of the die 418 to avoid possible damage to the cutting edges.

In using the K-knives it is important to insure that the point midway between the two V-cuts will come at the center of the between-substance. This condition is obtained by reason of the provisions, already described, for automatically alining and gaging the knives with relation to the edges of the sole.

The knife arrangements of the machine as so far described are adapted for operation upon ordinary double-lipped insoles. A special knife arrangement may be employed for operations on so-called Uni-channel insoles of the type disclosed in United States Letters Patent No. 2,146,814, granted February 14, 1939, upon the application of James P. Fredericksen. The heel end of such an insole S' is shown in Figs. 30 and 31. This insole is prepared by first rounding a sole blank to a shape having a heel portion of normal outline and a forepart extending beyond the normal outline. The normal outline is indicated by the line 454 and the outline of the extended forepart by the line 459, the latter outline merging into the former along inclined lines 460 extending rearwardly from approximately the heel-breast line. Ordinarily the insole is then channeled by forming a slit extending inwardly from the edge around the extended forepart, the depth of this slit being indicated by the line 458. The feather of the insole is trimmed to the normal outline 454, leaving an extending lip 456 which is later folded back upon itself to form an upstanding rib. When the lip is thus folded the outer edge of the lip will coincide substantially with the normal outline of the insole. The trimming of the feather may be performed simultaneously with the channeling operation. It will be observed that a lip thus formed, and consequently the rib formed by folding the lip back upon itself, will not terminate squarely in the vicinity of the heel-breast line.

The special knife arrangement mentioned in the preceding paragraph and presently to be described is for the purpose of incising these special insoles in such a manner as to cause the ribs to terminate squarely. The operation is performed before the channeling of the sole and the trimming of the feather, and consists in making the transverse straight cuts 296 and 298, as already described for ordinary insoles, to a depth equal to the thickness of the lip to be formed, and also in cutting through the entire thickness of the sole to remove the triangular pieces having the inclined edges 460. The sole is gaged by the two rear fingers 54 and 58 in contact with the opposite lateral edges of the normal heel portion, and by two forward fingers 276 adjusted to allow for the excess width of the extended forepart.

For making the transverse straight cuts 296 and 298 at the respective edges of the uni-channel insole, a pair of straight-edged knives 462 similar to the knives 60 and 62 but having longer cutting edges are employed. The arrangements for mounting the knives 462 are shown in Figs. 32 and 33. Only the right-hand knife 462 and its carrier blocks appear in the front elevational view, Fig. 33, the showing of the corresponding left-hand members having been omitted in order to avoid obscuring other parts later to be described. Each knife 462 is slidable for heightwise adjustment in a vertical dovetail guideway formed in a block 500 which, like the block 300, has an under surface for bearing upon the sole to gage the depth of the cut. The block 500 is split vertically along the guideway and is provided with a clamping screw 502 which urges the two sections of the block together to hold the knife 462 in its adjusted position. The block 500 is provided with a dovetail for sliding engagement with a guideway formed in a block 504 and extending forwardly and rearwardly of the machine. The block 504 is split along its guideway and is provided with a clamping screw 506 for holding the block 504 in adjusted position. The block 504 is provided with a dovetail for sliding engagement with a transverse guideway formed in a split block 508. A clamping screw 510 urges the two sections of the block 508 together to clamp the block 504 in adjusted position. Extending upwardly from the block 508 is a stem 512 similar to the stem 314 and which engages the bore 316 in the same manner as the stem 314. Each knife is similarly connected to its associated stem 512, and it is thus apparent that the provisions for mounting the knives 462 are generally similar to the provisions for mounting the knives 60 and 62.

For cutting off the triangular pieces having the inclined edges 460, there are provided a pair of knives 464 associated with the respective knives 462 and having L-shaped cutting edges. Each knife 464 has one of the branches of the L of its cutting edge substantially in line with the edge of its associated knife 462 with the adjacent blade portions of the two knives in relative sliding contact with each other. The rearwardly extending branch of the L must register with the normal edge of the sole, and this is accomplished by the provisions, already described, for gaging and alining the knives with relation to the edges of the sole. In order more clearly to show the mounting arrangements for the knives 464, the lower portion of the left-hand swivel block 248 is shown in Fig. 33 as it would appear in a section taken rearwardly of the stem 512. The left-hand knife 464 and its carrier blocks are thus left unobscured by the left hand knife 462 and its associated carrier blocks. Each knife 464 has a shank portion 465 extending upwardly from the branch of the L which is in line with the edge of the knife 462. This shank constitutes a dovetail slide to provide for heightwise adjustment in a vertical guideway formed in a block 466. Such adjustment is facilitated by a screw 468 threaded into the block 466 and having a downwardly extending head against which the blunt upper edge of the other branch of the L is urged into contact in making the adjustment. The screw 468 serves also to transmit a thrust directly to the cutting edge beneath it. The block 466 is partially split in the usual way and the two sections of the block are urged together by a clamping screw 470 to hold the slide in adjusted position. The block 466 is provided with a dovetail 472 which engages a horizontal guideway extending forwardly and rearwardly of the machine and formed in the under surface of a block 474. The block 466 may be secured in any desired position of adjustment in the block 474, which is split along its guideway, by means of a clamping screw 476 which urges together the two sections of the block 474. A dovetail extending from the block 474 slidably engages a transverse guideway formed in a block 478 which is rigidly secured to the under surface of the plate-like extension 258 of one of the swivel blocks 248. The block 478 is split along its guideway and is provided with a clamping screw 480 for binding the two sections of the block against the dovetail to hold the block 474 in adjusted position. It will be understood that each knife 464 is connected to its associated swivel block 248 in the same way, and that the various connecting elements above described in the singular are provided in duplicate for the respective knives.

The adjustment of the blocks 466 and 500 forwardly and rearwardly of the machine should be such as to bring the adjacent blade faces of their respective knives into sliding contact as above described. The fore-and-rear adjustment, and also the lateral adjustment, of each L-knife should be such as to bring the vertex of the L in line with the axis of its swivel block 248. The work table 50 is provided with a brass insert 482 against which the knife 464 strikes in completing its cutting stroke. It is evident that with this arrangement of knives, the knife 462 which is backed yieldingly by the spring 318 will cut as deeply as permitted by the gaging surface of the block 500. The knife 462 should be adjusted to bring its cutting edge just low enough to cut through the thickness of the lip 456 subsequently to be formed without cutting further into the body portion of the sole. The knife 464, however, being positively connected to the head 64 so far as downward movement is concerned will partake of the full downward movement of the head, and should accordingly be adjusted heightwise in the block 466 to bring its cutting edge into engagement with the brass insert 482 when the head 64 occupies its lowermost position. The knives 462 and 464, like the various knives previously described, when properly adjusted will occupy positions slightly rearward of the die 418 to avoid any possible danger of the cutting edges striking the die.

The knife arrangement illustrated in Figs. 30 to 34 inclusive, and described in the foregoing paragraphs, is not claimed herein, but is disclosed and claimed in my divisional application for United States Letters Patent, Serial No. 433,893, filed March 9, 1942.

Having described my invention, what I claim as new and desire to secure by Letters Patent of the United States is:

1. A sole-fitting machine comprising a work table for supporting a sole, a vertical guideway, a head movable along said guideway toward and from said work table, a horizontal guideway in said head, a pair of slides movable along said horizontal guideway, an operating tool carried by each of said slides, an edge gage carried by each of said slides, yieldable means for moving said slides toward each other until said gages engage the opposite lateral edges of a sole on said work table to gage said tools relatively to said lateral edges, and means for moving said head toward the work table to cause the tools to operate upon the sole.

2. A sole-fitting machine comprising a sole support, a head, a guideway on said head extending transversely of a sole on said sole support, a pair of slides in said guideway, a tool pivotally mounted on each of said slides, means for moving said head toward said sole support to cause the tools to operate upon the sole thereon, and gage mechanism for positioning said slides in said guideway and for alining each tool upon its slide in relation to the edges of the sole to be operated upon.

3. A sole-fitting machine comprising a work table having a sole-supporting surface, a head, a guideway on said head extending substantially parallel to said sole-supporting surface, a slide in said guideway, a block mounted on said slide for pivotal movement in a plane substantially parallel to said sole-supporting surface, a tool carried by said block, means for moving said head toward said sole-supporting surface to cause the tool to operate upon a sole thereon, and a pair of gage fingers carried by the block and engageable with an edge of the sole to position the slide in the guideway and also to aline the tool in relation to the edge of the sole.

4. In a sole-fitting machine, a pair of carriers mounted for movement toward and from each other, a connection for coordinating the movements of said carriers, a block mounted for pivotal movement on each of said carriers, a pair of gage members on each of said blocks, each pair of gage members being adapted to engage a sole at spaced points along a lateral edge of the sole opposite to the lateral edge engaged by the other pair, a connection for coordinating the pivotal movements of said blocks, a rotary cam, a linkage between said cam and the connection coordinating the movement of the carriers for transmitting to the carriers as the cam rotates a movement toward each other whereby the gage members are brought into engagement with the opposite lateral edges of a sole to center and aline the sole, and a spring interposed in said linkage to limit the pressure exerted by the gage members upon the sole, said pressure being equally distributed among the four gage members by reason of the pivotal mounting of the blocks and also by reason of the connection coordinating the movement of the carriers.

5. A gage mechanism for centering and alining a sole, comprising a pair of carriers mounted for movement toward and from each other, a connection for coordinating the movements of said carriers, a block mounted for rotary movement on each of said carriers, a pair of gage elements on each of said blocks, each pair of gage elements being adapted to engage a sole at spaced points along a lateral edge of the sole opposite to the lateral edge engaged by the other pair, a connection for coordinating the rotary movements of said blocks, and means for urging said carriers toward each other until all of the gage elements have engaged a sole.

6. A gage mechanism for centering and alining a sole, comprising a sole support, a pair of carriers mounted for movement toward and from each other, a connection between said carriers for maintaining said carriers at equal distances from a common center line, a pivotally mounted block on each of said carriers, a pair of gage fingers on each of said blocks, each pair of gage fingers being adapted to engage a sole at spaced points along a lateral edge of the sole opposite to the lateral edge engaged by the other pair, a connection between said blocks for coordinating the movements of the blocks with respect to said common center line, and means for urging said carriers toward each other until all of the gage fingers have engaged the sole.

7. A gage mechanism for centering and alining a sole, comprising a work table for supporting a sole, a pair of carriers mounted for movement toward and from each other, an articulated connection between said carriers for maintaining said carriers at equal distances from a common center line, a pivotally mounted block on each of said carriers, a pair of gage fingers on each of said blocks, each pair of gage fingers being adapted to engage a sole on the work table at spaced points along a lateral edge of the sole opposite to the lateral edge engaged by the other pair, a pair of links having ends pivotally connected to said blocks respectively, a common pivot connecting the opposite ends of said links, means for guiding said common pivot along said common center line to maintain the opposite pairs of gage fingers in symmetrical relation to each other about said center line, and means for urging said carriers toward each other until all of the gage fingers have engaged the sole.

8. In a sole-fitting machine, a pair of gages engageable with the opposite edges of a sole, a support for each of said gages, a connection between said supports for coordinating their movements laterally of a sole, each of said supports having a guideway extending laterally of the sole and each of said gages being slidable in said guideway toward and from the other for purposes of adjustment, and means for securing said gages in adjusted position.

9. In a sole-fitting machine, a work table for supporting a sole, a gage normally positioned high enough above said work table to enable a sole on the work table to be passed therebeneath, and a support constructed and arranged to enable said gage after a sole has been passed therebeneath to be lowered into a position wherein it can be engaged by an edge of the sole.

10. In a sole-fitting machine, a work table for supporting a sole, a gage normally positioned high enough above said work table to enable a sole on the work table to be passed therebeneath, a support constructed and arranged to enable said gage after a sole has been passed therebeneath to be lowered into a position wherein it can be engaged by an edge of the sole, and means for moving the sole against the lowered edge gage to position the sole on the work table.

11. In a sole-fitting machine a work table for supporting a sole, a gage engageable with an edge of a sole on said work table, a gage normally positioned high enough above said work table to enable a sole on the work table to be passed therebeneath into engagement with the first-mentioned gage, a support constructed and arranged to enable the second-mentioned gage after a sole has been passed therebeneath to be lowered into a position wherein it can be engaged by an edge of the sole opposite the edge engaged by the first-mentioned gage, and a connection between said gages for coordinating their movements laterally of the sole with respect to a common center, said gages being thereby operable to center the sole on the work table after the second-mentioned gage has been thus lowered.

12. In a sole-fitting machine, a work table having a sole-supporting surface, a head mounted for movement from a raised position toward said sole-supporting surface, a gage carried by said head and engageable with an edge of a sole on said work table when the head is in its raised position, a gage carried by said head and positioned high enough above the work table when the head is in its raised position to enable a sole on the work table to be passed therebeneath into engagement with the first-mentioned gage, the second-mentioned gage being positioned low enough when the head is lowered to be engageable with the edge of the sole opposite that engaged by the first-mentioned gage, a connection between each of said gages and said head for enabling the gages to yield upon contact with the surface of the work table when the head is lowered, and a connection between said gages for coordinating their movements laterally of the sole with respect to a common center, said gages being thereby operable to center the sole on the work table after the head has been lowered sufficiently to bring the second-mentioned gage into operating position.

13. In a sole-fitting machine, a work table having a sole-supporting surface, a head mounted for movement from a raised position toward said sole-supporting surface, a tool constructed and arranged to perform an operation upon a face of a sole on the work table by pressure resulting from a lowering movement of the head from said raised position, a gage carried by said head and engageable with an edge of a sole on said work table when the head is in its raised position, a gage carried by said head and positioned high enough above the work table when the head is in its raised position to enable a sole on the work table to be passed therebeneath into engagement with the first-mentioned gage, the second-mentioned gage being positioned low enough when the head is lowered to be engageable with the edge of the sole opposite that engaged by the first-mentioned gage, a connection between each of said gages and said head for enabling the gages to yield upon contact with the surface of the work table when the head is lowered, a connection between said gages for coordinating their movements laterally of the sole with respect to a common center, and means for lowering said head and effecting simultaneous lateral movements of said gages in timed relation, the lateral movements of the gages whereby the sole is centered relatively to the tool taking place after the head has been lowered sufficiently to bring the second-mentioned gage into operating position, and the latter portion of the lowering movement of the head serving to develop a pressure which causes the tool to operate upon the sole.

14. In a sole marking machine, a gage, a shaft mounted for rotation and also for axial displacement from a normal position, a helical cam slidably keyed upon said shaft, a connection between said cam and said gage for adjusting the position of the gage by turning of the shaft, a device having a plurality of marking dies, means operated by the shaft in turning for bringing a selected die into operative position with respect to a sole positioned by said gage, a dial having markings corresponding to said marking dies to indicate which of the dies is in operating position, a connection for rotating the dial with the shaft, said connection being constructed and arranged for relative rotary adjustment between the marking device and the dial to vary the correspondence between the marking dies and the dial markings by turning of the shaft when the shaft is displaced axially from normal position, and means for sliding said cam along the shaft to adjust the position of the gage independently of the marking device and of the dial.

15. In a sole-marking machine, a shaft supported for rotary and axial movement, spring means for yieldably holding said shaft axially in a normal position, a disk rotatably mounted on said shaft, a plurality of marking dies carried by said disk and arranged to be brought successively into operating position by turning of the disk, a dial having scale markings corresponding to the respective dies, said dial being secured upon said shaft to turn and to move axially therewith, and a connection between said dial and said disk for causing the disk to turn with the dial, said connection being constructed and arranged to disengage when the shaft is moved axially from normal position to permit a relative rotary adjustment between the disk and the dial.

16. In a sole-marking machine, a shaft supported for rotary and axial movement, spring means for yieldably holding said shaft axially in a normal position, a sleeve rotatably mounted on the shaft, a disk secured upon said sleeve, a plurality of marking dies carried by said disk and arranged to be brought successively into operating position by turning of the sleeve, a dial secured upon said sleeve, said sleeve, disk and dial being turnable as a unit upon the shaft, means for holding the sleeve, disk and dial against axial movement when the shaft is moved axially, a second dial secured upon the shaft to turn and to move axially therewith, a set of scale markings upon each of said dials, each set of scale markings corresponding to the respective dies, and a connection for causing the first-mentioned dial to turn in unison with the second-mentioned dial, said connection being constructed and arranged to disengage when the shaft and the second-mentioned dial are moved axially from normal position to permit a relative rotary adjustment between the two dials and thereby to vary the relation between the dies and the corresponding scale markings on one of the dials.

17. In a sole-marking machine, a pair of rotary disks, a plurality of marking dies carried by each of said disks and arranged to be brought successively into operating position by turning of their respective disks, a pair of dials mounted for rotation about a common axis and having scale markings corresponding to the dies of the respective disks, said dials being constructed and arranged to turn in unison by reason of frictional engagement with each other, connections between said disks and said respective dials for causing each disk to turn with its associated dial, and disengageable means for latching one of said dials in a desired position of rotary adjustment, whereby the disks may be brought into operating position by turning the dials in unison to bring one of the disks into operating position while said latch is disengaged, whereupon the dial corresponding to that disk may be latched and the other dial may be turned to bring its associated disk into operating position, the frictional engagement of the latched dial serving to hold the other dial in adjusted position.

18. In a sole-fitting machine, a work table, a head mounted for movement toward and from said work table, a tool on said head for operating on a sole on said work table, an abutment, a pair of toggle links pivotally connected together at their ends, the opposite ends of said links being pivotally connected to said abutment and said head respectively, means tending to straighten said toggle links to urge the head toward said work table for the purpose of causing said tool to perform an operation upon the sole on the work table, a support for said abutment constructed and arranged to yield in accordance with the thickness of the sole upon straightening of the toggle, and means operable before completion of the straightening movement of the toggle links to hold said abutment against yielding and thereby to cause the pressure developed by said toggle links during the remainder of their straightening movement to be applied positively.

19. A sole-fitting machine comprising a pair of members constructed and arranged for engagement with the opposite faces of a sole, one of said members being a tool for operating upon a sole pressed between the members, a driven cam, mechanism operated by said cam for urging one of said members toward the other, a spring associated with said mechanism for enabling said mechanism to yield in accordance with the thickness of the sole and thereby to limit the pressure applied to the sole, and means actuated by said mechanism upon engagement therewith at a predetermined point in its movement for rendering the mechanism positive and thereby causing an additional pressure which is independent of the thickness of the sole to be exerted upon the sole, the operation of the tool upon the sole resulting from the application of such additional pressure.

20. A sole-fitting-machine comprising a pair of members engageable with the opposite faces of a sole, one of said members being adapted to perform an operation upon the sole by pressure, an abutment, a pair of toggle links pivotally connected end to end, the opposite ends of said links being pivotally connected to one of said members and to said abutment respectively, said links being arranged to urge the sole-engaging member to which one of them is connected toward the other sole-engaging member upon straightening movement of the links, means for guiding said connected sole-engaging member toward and from the other sole-engaging member, means for straightening the toggle links to cause a sole to be pressed between said sole-engaging members, a support for said abutment constructed and arranged to yield upon straightening of the toggle links to limit the pressure applied to the sole regardless of the thickness of the sole, and means operable before completion of the straightening movement of the toggle links to hold said abutment against yielding and thereby to cause the pressure developed by said toggle links during the remainder of their straightening movement to be applied positively, the positive pressure thereby exerted causing the desired operation to be performed upon the sole.

21. In a sole-fitting machine adapted to operate upon a sole by pressure, means for developing said operating pressure, a device having a predetermined range of movement for operating said pressure-developing means, a member associated with said pressure-developing means for controlling the pressure developed, a spring supporting said control member and arranged to yield in accordance with the thickness of the sole to limit the pressure developed during a preliminary portion of said movement of said operating device, and a hydraulic mechanism constructed and arranged to yield freely during said preliminary portion of movement and to afford a positive support to said control member after said spring has yielded for a particular sole thereby enabling the operating device during the latter portion of its movement to cause the development of an operating pressure which is substantially independent of the thickness of the sole.

22. In a sole-fitting machine adapted to operate upon a sole by pressure, means for developing said operating pressure, a member associated with said pressure-developing means for controlling the pressure developed thereby, a spring for supporting said member, said spring being arranged to yield to limit the pressure exerted upon a sole regardless of the thickness of the sole, and a hydraulic mechanism comprising a cylinder, a plunger in said cylinder, a valve mechanism for controlling the escape of liquid confined between said plunger and the interior of said cylinder, means for closing said valve mechanism to prevent the escape of liquid, and a connection from said plunger to said control member for positively supporting the control member when the valve mechanism is closed, said plunger being free while the valve mechanism is open to move in said cylinder as the spring yields to accommodate the thickness of a sole being operated upon, whereupon the closing of the valve mechanism enables a positive operating pressure to be developed.

23. In a machine for operating upon soles, a knife comprising an integral piece of material having a plurality of angularly disposed cutting edges at the ends of similarly disposed blade portions, means for operating said knife including an abutment engageable with all of said blade portions to transmit a thrust directly to each of said cutting edges, and a support in which said knife is adjustably secured in a position determined by said abutment.

24. In a machine for operating upon soles, a knife K-shaped in cross section to provide a plurality of angularly disposed blade portions, said blade portions at one end of the knife being ground to provide two pairs of V-shaped cutting edges, and an adjusting screw having its axis between the two V's formed by the cutting edges, said screw having a flat head in abutting engagement with all of the blade portions at the end of the knife opposite the cutting edges to transmit a thrust through the knife directly to each of said cutting edges.

FREDERIC E. BERTRAND.